United States Patent
Kielmann et al.

(10) Patent No.: US 7,497,496 B2
(45) Date of Patent: Mar. 3, 2009

(54) VEHICLE AND FOLDING ROOF TOP FOR A VEHICLE

(75) Inventors: Marc Kielmann, Kirchheim/Teck (DE); Ralf Johe, Erligheim (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 11/676,282

(22) Filed: Feb. 17, 2007

(65) Prior Publication Data
US 2007/0194591 A1 Aug. 23, 2007

(30) Foreign Application Priority Data
Feb. 18, 2006 (DE) .................. 10 2006 007 635

(51) Int. Cl.
*B60J 7/00* (2006.01)
(52) U.S. Cl. .................. 296/107.08; 296/100.17
(58) Field of Classification Search .......... 296/107.08, 296/76, 107.17, 107.01, 136.06, 219, 136.01, 296/108
See application file for complete search history.

(56) References Cited

U.S. PATENT DOCUMENTS

| | | | | |
|---|---|---|---|---|
| 5,360,254 A | * | 11/1994 | Sorimachi et al. | 296/218 |
| 5,649,733 A | * | 7/1997 | Seel et al. | 296/37.5 |
| 5,746,470 A | * | 5/1998 | Seel et al. | 296/108 |
| 5,775,766 A | * | 7/1998 | Schaible et al. | 296/107.09 |
| 5,823,606 A | * | 10/1998 | Schenk et al. | 296/107.08 |
| 5,975,619 A | * | 11/1999 | Dettling et al. | 296/107.08 |
| 6,095,589 A | | 8/2000 | Kinnanen et al. | |
| 6,145,915 A | * | 11/2000 | Queveau et al. | 296/107.08 |
| 6,299,234 B1 | * | 10/2001 | Seel et al. | 296/108 |
| 6,419,294 B2 | * | 7/2002 | Neubrand | 296/76 |
| 6,497,446 B2 | * | 12/2002 | Obendiek | 296/107.17 |
| 6,540,280 B2 | * | 4/2003 | Tamura et al. | 296/108 |
| 6,595,572 B2 | * | 7/2003 | Schuler et al. | 296/107.08 |
| 6,604,775 B2 | * | 8/2003 | Obendiek | 296/108 |
| 6,659,534 B2 | * | 12/2003 | Willard | 296/108 |
| 6,702,362 B2 | * | 3/2004 | Eichholz et al. | 296/108 |
| 6,715,819 B2 | * | 4/2004 | Weissmueller | 296/107.08 |
| 6,729,672 B2 | * | 5/2004 | Neubrand | 296/107.07 |
| 6,736,444 B2 | * | 5/2004 | Reinsch | 296/107.17 |
| 6,767,044 B2 | * | 7/2004 | Tohda et al. | 296/107.01 |

(Continued)

FOREIGN PATENT DOCUMENTS

DE 199 60 101 A1 6/2001

(Continued)

*Primary Examiner*—Kiran B. Patel
(74) *Attorney, Agent, or Firm*—Brooks Kushman P.C.

(57) ABSTRACT

A vehicle includes a foldable roof top and a trunk having a luggage compartment. A trunk lid is movable between a closed lid position in which the lid covers the trunk and an opened lid position in which the lid provides trunk access. The roof is movable between a closed roof position in which the roof parts cover the vehicle interior and an opened roof position in which the roof parts are folded and stored within the trunk over the compartment. When the lid is in the opened lid position the roof is movable from the opened roof position to a loading roof position in which the folded roof parts are raised over the trunk to provide compartment access. A blocking device prevents the lid from unintentionally closing when the lid is in the opened lid position and the roof is in the loading roof position.

9 Claims, 5 Drawing Sheets

U.S. PATENT DOCUMENTS

| | | | | |
|---|---|---|---|---|
| 6,786,525 B2* | 9/2004 | Russke et al. | | 296/76 |
| 6,824,194 B2* | 11/2004 | Weissmueller et al. | | 296/136.05 |
| 6,848,736 B2* | 2/2005 | Guillez | | 296/107.08 |
| 6,866,322 B2* | 3/2005 | Willard | | 296/107.01 |
| 6,866,327 B2* | 3/2005 | Willard | | 296/136.06 |
| 6,923,491 B2* | 8/2005 | Hahn | | 296/107.08 |
| 7,000,973 B2* | 2/2006 | Guillez et al. | | 296/107.08 |
| 7,014,247 B2* | 3/2006 | Dilluvio | | 296/107.17 |
| 7,093,885 B2* | 8/2006 | Guillez et al. | | 296/107.08 |
| 7,118,160 B2* | 10/2006 | Willard | | 296/107.01 |
| 7,128,362 B2* | 10/2006 | Telehowski | | 296/107.08 |
| 7,354,098 B2* | 4/2008 | Bullinga et al. | | 296/146.8 |
| 2003/0034667 A1* | 2/2003 | Willard | | 296/108 |
| 2003/0042751 A1* | 3/2003 | Antreich | | 296/107.17 |
| 2004/0164586 A1* | 8/2004 | Tezuka | | 296/108 |
| 2004/0178656 A1 | 9/2004 | Hahn | | |
| 2006/0267371 A1* | 11/2006 | Queveau et al. | | 296/107.18 |
| 2007/0108793 A1* | 5/2007 | Schumacher et al. | | 296/107.08 |
| 2007/0182196 A1* | 8/2007 | Roder | | 296/76 |
| 2007/0194591 A1* | 8/2007 | Kielmann et al. | | 296/76 |
| 2008/0030044 A1* | 2/2008 | Schroder | | 296/107.17 |

FOREIGN PATENT DOCUMENTS

| | | |
|---|---|---|
| DE | 102 16 417 A1 | 10/2003 |
| DE | 698 18 970 T2 | 7/2004 |

* cited by examiner

VEHICLE AND FOLDING ROOF TOP FOR A VEHICLE

CROSS-REFERENCE TO RELATED APPLICATIONS

This application claims foreign priority benefits under 35 U.S.C. § 119(a)-(d) to DE 10 2006 007 635.4, filed Feb. 18, 2006, which is hereby incorporated by reference in its entirety.

BACKGROUND OF THE INVENTION

1. Field of the Invention

The present invention relates to vehicles having folding roof tops.

2. Background Art

DE 199 60 101 C2 describes a vehicle having a folding roof top. The roof is movable between a closed position in which the roof covers the vehicle interior and an opened position in which the roof is folded and lowered into the trunk of the vehicle for storage therein. A trunk lid may close to cover the trunk while the roof is stored therein. To allow access to a luggage compartment within the trunk, the folded roof may be moved out of the trunk to a loading position.

DE 698 18 970 T2 (corresponding to U.S. Pat. No. 6,095,589) describes a vehicle having a folding roof top. The roof is movable between a closed position in which the roof covers the vehicle interior and an opened position in which the roof is folded and lowered into the trunk of the vehicle for storage therein. The vehicle includes a luggage compartment in the rear of the vehicle body. In the closed position of the roof, a tension bracket holds a section of the roof in position above the trunk. The tension bracket is pivotably supported on the vehicle body. An actuating system moves the tension bracket into a raised position to provide access to the trunk. The actuating system may be activated by switching an operating switch provided on the vehicle body.

SUMMARY OF THE INVENTION

An object of the present invention is a folding top which is movable from an opened position in which the folded top is stored within the trunk of a vehicle to a loading position in which the folded top is raised to a loading position above the trunk while the trunk lid is opened to thereby provide access to a luggage compartment of the trunk with precautions taken to prevent unintentional closing of the trunk lid against the folded top while the folded top is in the loading position.

Another object of the present invention is a vehicle having the folding top.

In carrying out the above objects and other objects, the present invention provides a vehicle having a folding top ("roof"). The vehicle includes a trunk having a luggage compartment. A trunk lid is movably connected to the vehicle body to move between a closed lid position in which the trunk lid covers the trunk and an opened lid position in which the trunk lid exposes the trunk to provide access therein. The roof has a plurality of roof parts including a rear roof part. The roof is movable between a closed roof position in which the roof parts cover the vehicle interior and an opened roof position in which the roof parts are folded together and stored within the trunk over the luggage compartment. When the trunk lid is in the opened lid position the roof is movable from the opened roof position to a loading roof position in which the roof parts are folded together and raised over the trunk to provide access to the luggage compartment. A blocking device cooperates with the trunk lid to prevent the trunk lid from unintentionally closing against the roof parts when the trunk lid is in the opened lid position while the roof is in the loading roof position.

Further, in carrying out the above objects and other objects, the present invention provides a method for a folding top ("roof") of a vehicle. The method includes moving a roof having a plurality of roof parts into an opened roof position in which the roof parts are folded together and stored within a trunk of a vehicle. The method further includes moving a trunk lid to an opened lid position to enable the roof to be raised out from the trunk. The method further includes actuating an actuating switch connected to a drive system to actuate the drive system for moving the roof from the opened roof position to a loading roof position in which the roof parts are folded together and raised over the trunk. The method further includes disabling the drive system from moving the roof upon the roof being moved into the loading roof position. The step of disabling includes a support member on one of the roof parts actuating a limit switch connected to the drive system upon the roof being in the loading roof position to de-actuate the drive system. The method further includes blocking the trunk lid from moving toward the trunk while the trunk lid is in the opened lid position and the roof is in the loading roof position. The step of blocking includes the trunk lid and a blocking device cooperating with one another to prevent the trunk lid from moving while the trunk lid is in the opened lid position and the roof is in the loading roof position.

Also, in carrying out the above objects and other objects, the present invention provides a folding roof top for a vehicle. The vehicle includes a trunk having a luggage compartment. The vehicle further includes a trunk lid movably connected to the vehicle body to move between a closed lid position in which the trunk lid covers the trunk and an opened lid position in which the trunk lid exposes the trunk to provide access therein.

The folding roof top includes a roof having a plurality of roof parts including a rear roof part. The roof is movable between a closed roof position in which the roof parts cover the vehicle interior and an opened roof position in which the roof parts are folded together and stored within the trunk over the luggage compartment. When the trunk lid is in the opened lid position the roof is movable from the opened roof position to a loading roof position in which the roof parts are folded together and raised over the trunk to provide access to the luggage compartment. The folding roof top further includes a blocking device. The blocking device cooperates with the trunk lid to prevent the trunk lid from unintentionally closing against the roof parts when the trunk lid is in the opened lid position while the roof is in the loading roof position.

In accordance with embodiments of the present invention, the blocking device reliably prevents the trunk lid from closing when the roof is in the loading position to prevent damage to the trunk lid or the roof. The blocking device is arranged between the trunk lid and the roof. The blocking device includes first and second support members. The first support member is attached to the trunk lid and the second support member is attached to a roof part of the roof. While the roof is in either of its opened or loading positions, the outer side of the rear roof part of the roof faces the roadway of the vehicle and the inner side of the rear roof part faces the top side of the vehicle. The second support member is provided on at least one lateral longitudinal section of the inner side of the rear roof part. Proper cooperation of the second support member with the first support member is achieved as the second support member includes an elastic component formed by a sealing body of the rear roof part. The blocking device and a limit switch may be structurally combined for simplification. For this purpose, the blocking device and the limit switch may be combined into a module so that a vehicle may have a single module.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
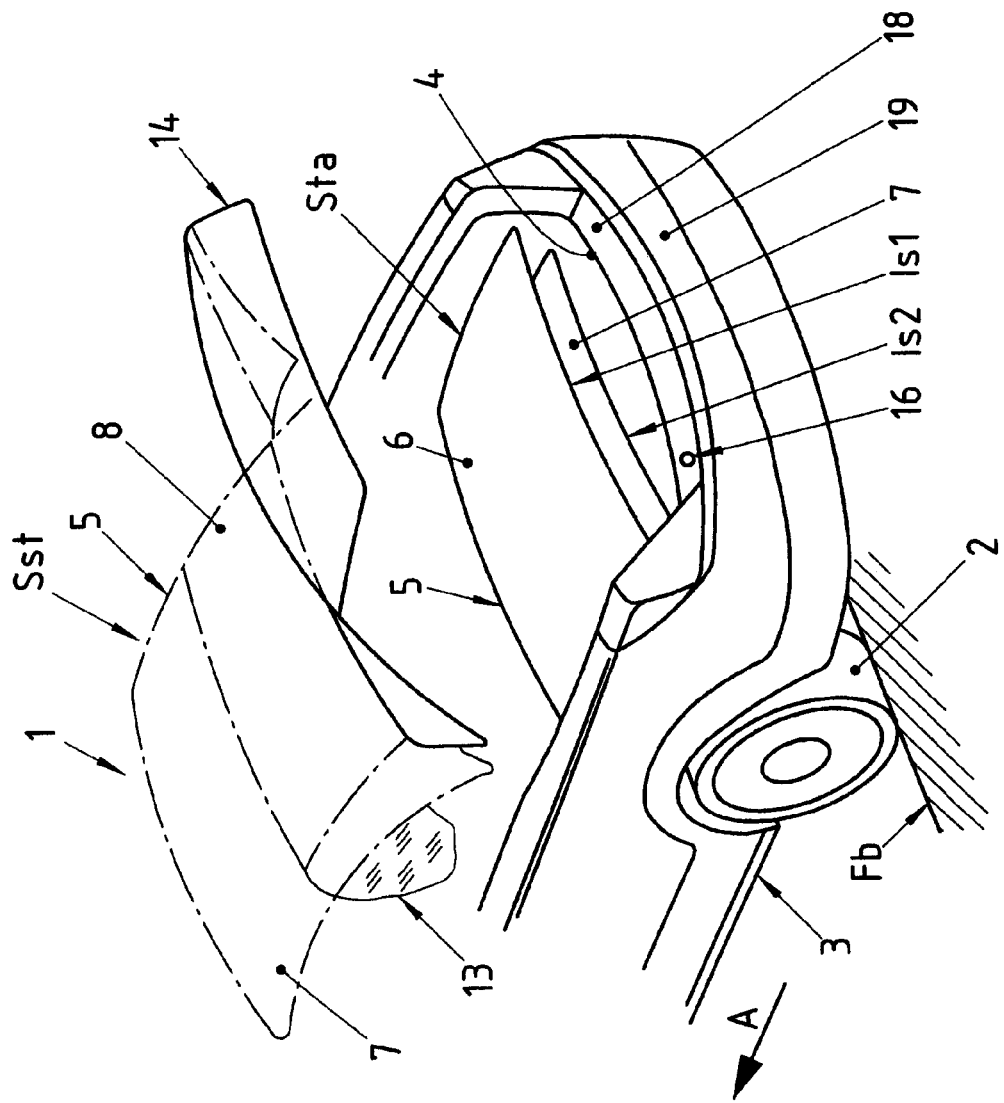
FIGS. 1 and 2 illustrate a vehicle having a folding roof top in accordance with an embodiment of the present invention.
Figure 2:
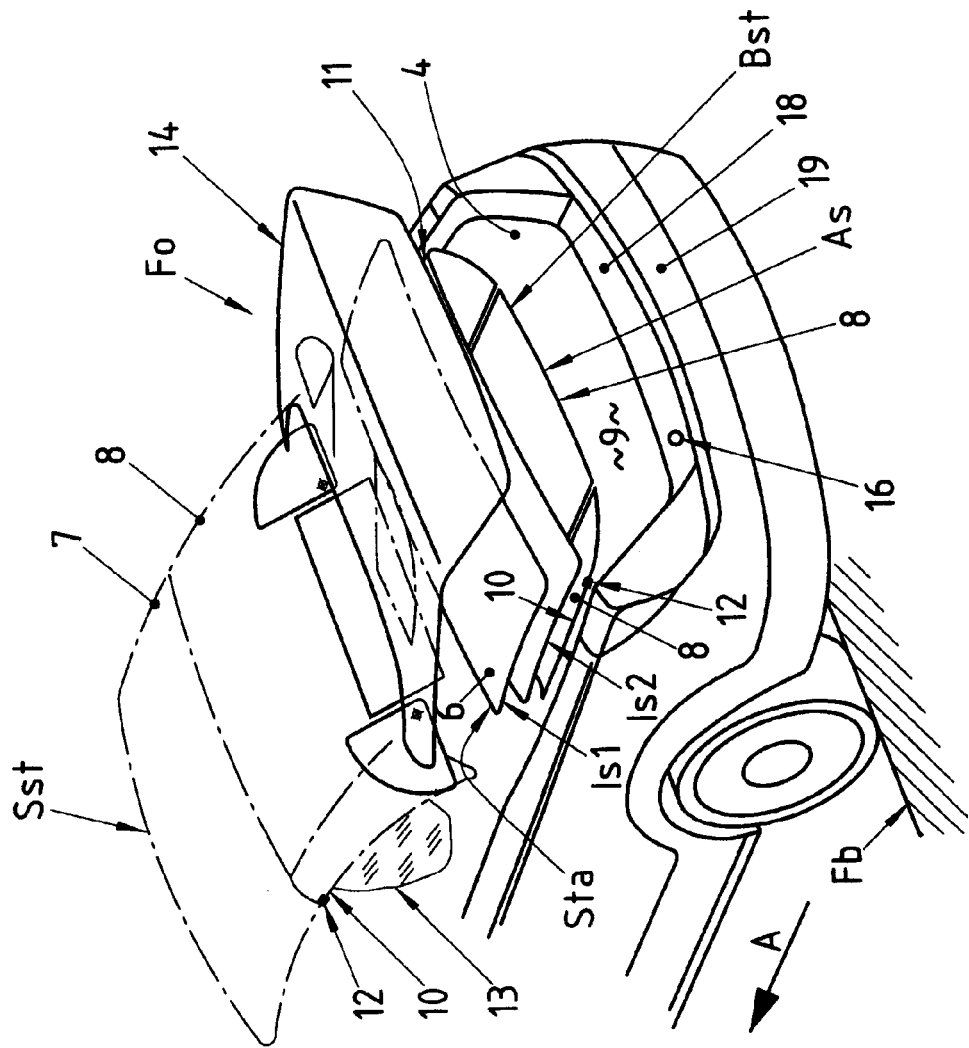

Referring now to FIGS. 1 and 2, a vehicle 1 having a folding roof top 5 in accordance with an embodiment of the present invention is shown. Vehicle 1 includes a vehicle body 3 supported by wheels 2. Vehicle 1 further includes a storage area (i.e., trunk 4) within a rear section of vehicle body 3. A luggage compartment 9 is located within trunk 4.

Top or roof 5 is a rigid roof/retractable hardtop (RHT) having a plurality of roof parts 6, 7, and 8. Roof parts 6, 7, and 8 include a front roof part 6, a middle roof part 7, and a rear roof part 8. Roof parts 6, 7, and 8 are articulately connected to one another to move together between a closed position Sst of roof 5 in which roof parts 6, 7, and 8 cover the vehicle interior and an opened position Sta of roof 5 in which roof parts 6, 7, and 8 are folded on top of one another and lowered into trunk 4 for storage therein thereby exposing the vehicle interior. The solid lines of roof parts 6, 7, and 8 in FIGS. 1 and 2 illustrate roof 5 in its opened position Sta whereas the dotted lines of roof parts 6, 7, and 8 in FIGS. 1 and 2 illustrate roof 5 in its closed position Sst.

Each roof part 6, 7, and 8 includes an inner side and an outer side which are bounded on each end by respective lateral longitudinal sections. Lateral longitudinal sections 10 and 11 of rear roof part 8 each include a sealing body 12. Sealing bodies 12 seal with adjacent body parts such as side windows 13 of vehicle 1 when roof 5 is in its closed position Sst.

In its opened position Sta, roof 5 is stored within trunk 4. Roof parts 6, 7, and 8 are folded on top of one another in a stack and the folded roof part stack is positioned above luggage compartment 9 within trunk 4. Front roof part 6 is situated above middle roof part 7 in such a way that inner side Is1 of front roof part 6 and inner side Is2 of rear roof part 7 face downward toward roadway Fb. Rear roof part 8 assumes a position in which outer side As of rear roof part 8 faces downward toward roadway Fb while inner side Is3 of rear roof part 8 faces upward toward top side Fo of vehicle 1.

Figure 3:
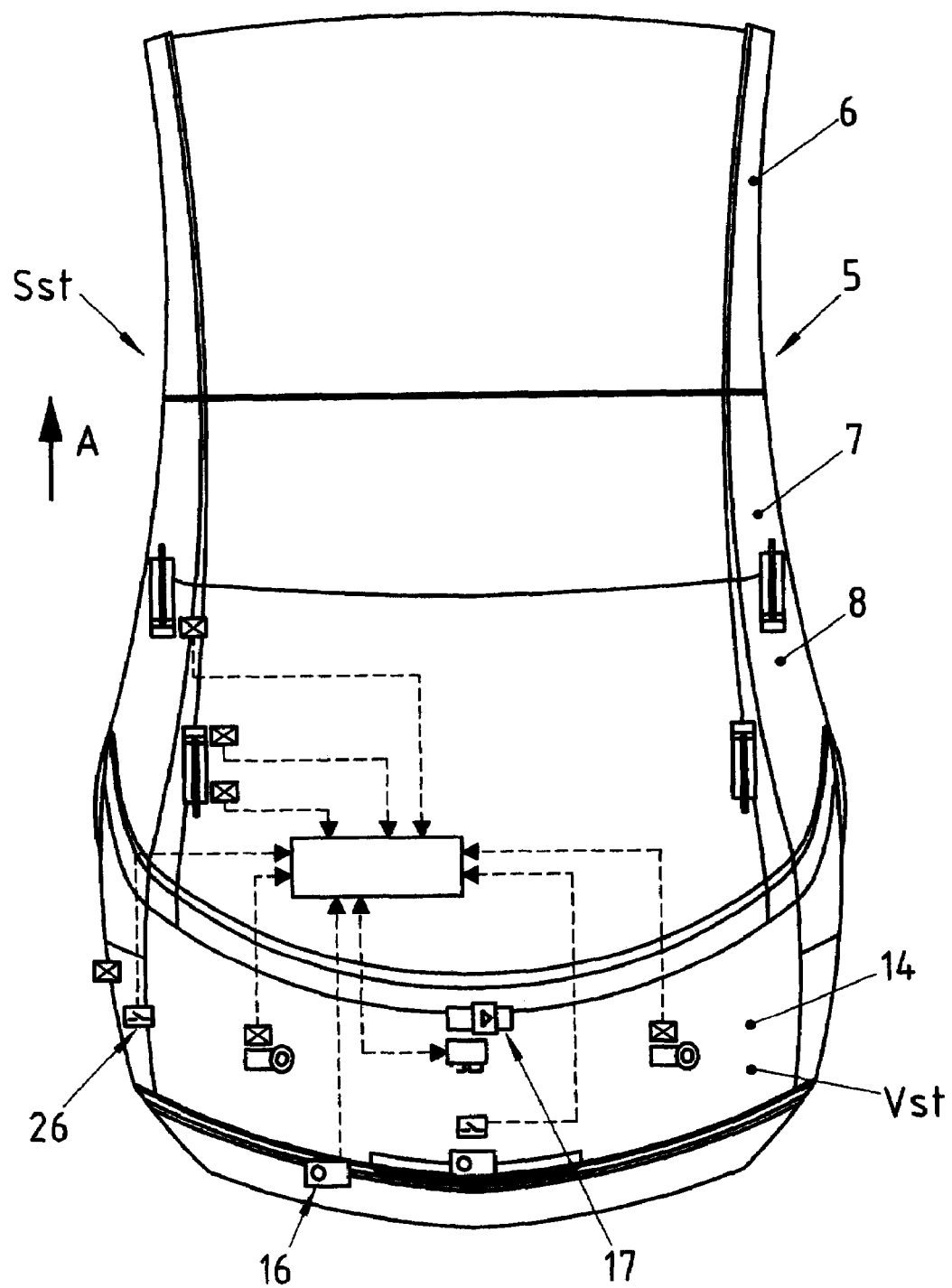
FIG. 3 illustrates a top view of the vehicle.
Figure 5:
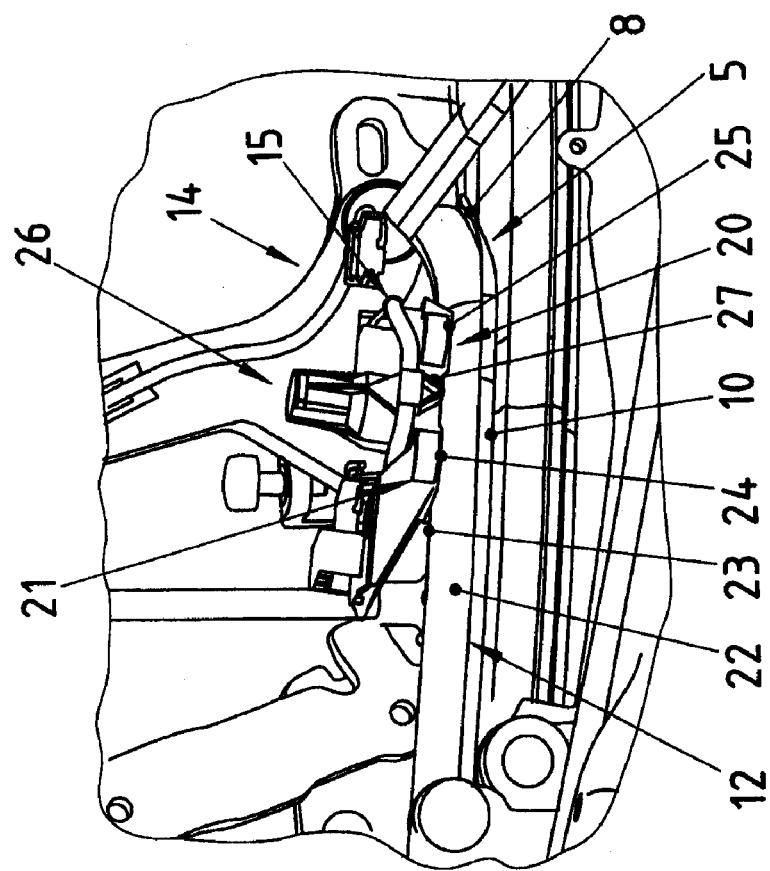
FIG. 5 illustrates detail X of FIG. 4 in enlarged scale showing the blocking device for the trunk lid.
Figure 4:
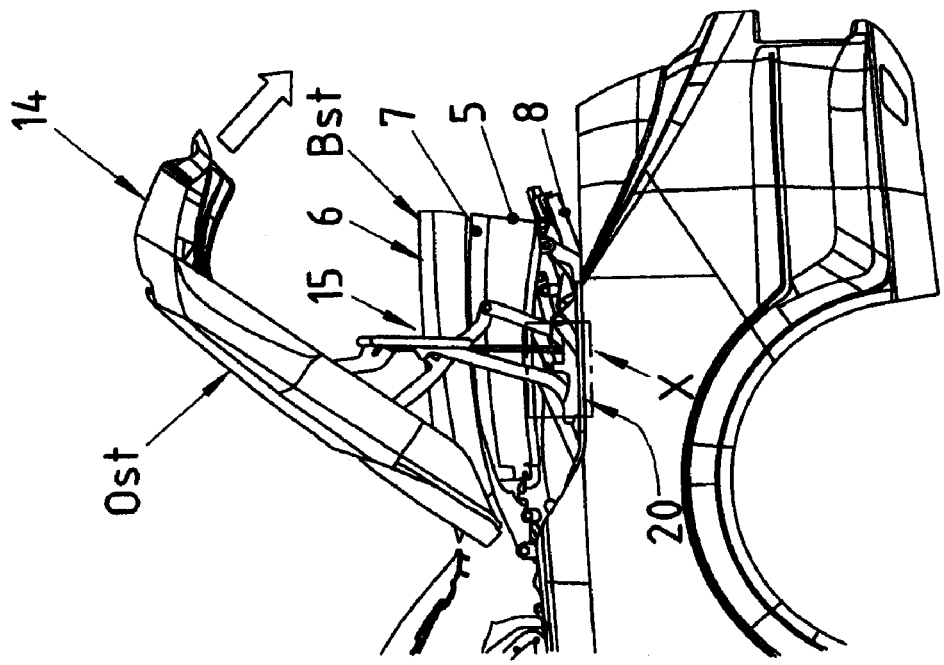
FIG. 4 illustrates view of one side of the vehicle with the trunk lid in its opened position and the folded roof in its loading position.
Figure 6:
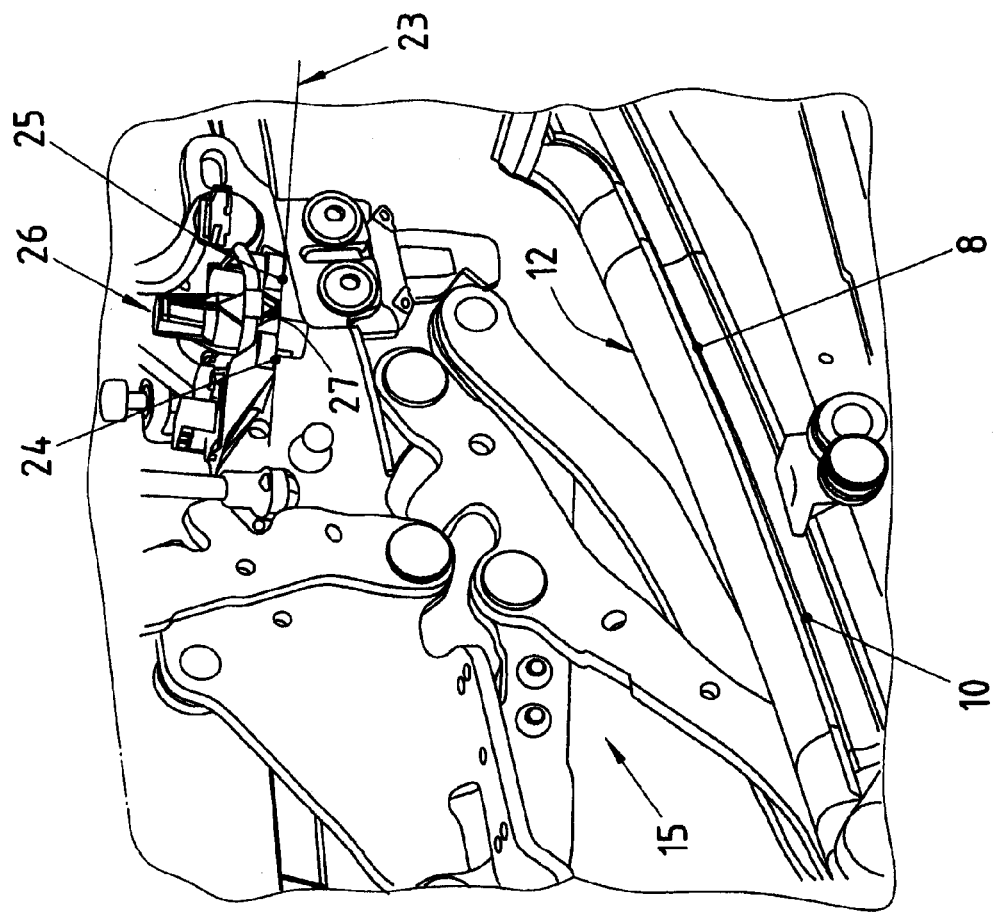
FIG. 6 illustrates an intermediate position of the rear roof part of the roof and the blocking device.

As shown in FIG. 3, trunk 4 is located behind rear roof part 8, as viewed in the direction of forward vehicle travel A, when roof 5 is in its closed position Sst. A trunk lid 14 spans trunk 4. Trunk lid 14 is movable between a closed position Vst (shown in FIG. 3) in which trunk lid 14 covers trunk 4 and an opened position Ost (shown in FIGS. 1, 2, and 4) in which trunk lid 14 provides access to trunk 4. Trunk lid 14 is articulately connected to vehicle body 3 to move between its closed and opened positions via a pair of hinges 15 located on each side of vehicle body 3. Trunk lid 14 may be manually swivelled between its closed position Vst and its opened position Ost.

As shown in FIG. 3, vehicle 1 includes a drive device 17. Drive device 17 is operable for moving the stacked roof parts 6, 7, and 8 from the opened roof position Sta to a loading position Bst of roof 5 (shown in FIGS. 2 and 4). Drive device 17 includes an electric motor and/or a hydraulic element which is connected to at least one of the roof parts such as rear roof part 8 for moving roof 5 from its opened position Sta to its loading position Bst. In the loading position Bst of roof 5, stacked roof parts 6, 7, and 8 are raised above trunk 4 to enable access to luggage compartment 9. As indicated above, stacked roof parts 6, 7, and 8 are positioned above luggage compartment 9 within trunk 4 when roof 5 is in its opened position Sta.

An actuating switch 16 is connected to drive device 17 to control the operation of drive device 17. Drive device 17 moves roof parts 6, 7, and 8 from the opened roof position Sta to the loading position Bst of roof 5 upon an operator actuating actuating switch 16. Actuating switch 16 is attached to a horizontal cross-member 18 of an end wall 19 of vehicle body 3. Actuating switch 16 is not accessible to an operator until trunk lid 14 is opened.

A blocking device 20 functions to fix trunk lid 14 in position when trunk lid 14 is in its opened position Ost and roof 4 is in its loading position Bst. Blocking device 20 fixes trunk lid 14 in this position so as to prevent damage to any of roof parts 6, 7, and 8 of roof 5 caused by unintentionally closing trunk lid 14 while roof 5 is in its loading position Bst.

Blocking device 20 is situated between trunk lid 14 and roof 5. Blocking device 20 includes a first support member 21 and a second support member 22. First support member 21 is on hinge 15 of trunk lid 14. Second support member 22 is on one of the roof parts such as rear roof part 8. For this purpose, lateral longitudinal section 10 of rear roof part 8 includes second support member 22. Second support member 22 is an elastic component formed by sealing body 12 which is present on rear roof part 8.

First support member 21 includes a support surface 23 facing second support member 22. Support surface 23 of first support member 21 includes relatively large, inter-spaced support surface sections 24 and 25. Support surface sections 24, 25 in the opened position Ost of trunk lid 14 and the loading position Bst of roof 5 are brought into contact with sealing body 12 of rear roof part 8. That is, support surface sections 24, 25 are brought into contact with second support member 22 when trunk lid 14 is in its opened position Ost and roof 5 is in its loading position Bst. In this position, motion of trunk lid 14 from its opened position Ost to its closed position Vst is counteracted.

Blocking device 20 is structurally combined with an electrical limit switch 26. Limit switch 26 is actuated by second support member 22, i.e., by sealing body 12, to stop drive device 17 after roof 5 has reached its loading position Bst. Limit switch 26 is a lifting switch which includes a contact element 27. Second support member 22 actuates contact element 27 while trunk lid 14 is in its opened position Ost or while roof 5 is in its loading position Bst.

The following operation sequence is employed to move roof 5 from its opened position Sta into its loading position Bst. Trunk lid 14 is moved into its opened position Ost. Trunk lid 14 maybe moved manually into its opened position Ost. Actuating switch 16 is actuated to actuate drive device 17. Upon being actuated, drive device 17 lifts the stacked roof parts 6, 7, and 8 of roof 5 from trunk 4 until second support member 22 actuates limit switch 26. Second support member 22 actuates limit switch 26 when roof 5 has reached its loading position Bst. In response to second support member 22 actuating limit switch 26, drive device 17 is de-actuated to stop lifting roof 5 from its loading position Bst. In the loading position Bst of roof 5, blocking device 20 is active to fix trunk lid 14 in place with respect to any closing motions.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A vehicle comprising:
    a trunk having a luggage compartment;
    a hinge;
    a trunk lid movably connected by the hinge to the vehicle body to move between a closed lid position in which the trunk lid covers the trunk and an opened lid position in which the trunk lid exposes the trunk to provide access therein;
    a roof having a plurality of roof parts including a front roof part and a rear roof part;
    wherein when the trunk lid is in the opened lid position the roof is movable from an opened roof position in which the roof parts are folded together and stored within the trunk over the luggage compartment to a loading roof position in which the roof parts are folded together and raised over the trunk to provide access to the luggage compartment; and
    a blocking device including first and second support members for preventing the trunk lid from unintentionally closing against the roof parts when the trunk lid is in the opened lid position while the roof is in the loading roof position, wherein the first support member is attached to the hinge and the second support member is attached to the rear roof part, wherein when the trunk lid is in the opened lid position and the roof is in the loading roof position the first and second support members are brought into contact with one another to counteract motion of the trunk lid from the opened lid position towards the closed lid position.

2. The vehicle of claim 1 wherein:
    the rear roof part includes outer and inner sides bounded on respective ends by lateral longitudinal sections, wherein the inner side of the rear roof part faces upward and the outer side of the rear roof part faces downward when the roof is in one of the opened roof position and the loading roof position;
    wherein the second support member is attached to one of the lateral longitudinal sections on the inner side of the rear roof part.

3. The vehicle of claim 1 wherein:
    the second support member includes an elastic component.

4. The vehicle of claim 3 wherein:
    the rear roof part includes a sealing body, wherein the sealing body forms the elastic component of the second support member.

5. The vehicle of claim 1 wherein:
    the first support member has a support surface facing the second support member.

6. The vehicle of claim 5 wherein:
    the support surface of the first support member includes inter-spaced support surface sections which are brought into contact with the second support member when the trunk lid is in the opened lid position and the roof is in the loading roof position.

7. The vehicle of claim 1 further comprising:
    a drive system, wherein the drive system moves the roof from the opened roof position toward the loading roof position upon actuation;
    wherein the blocking device includes an electrical limit switch which is operable with the drive system to de-actuate the drive system as soon as the roof moves from the opened roof position into the loading roof position.

8. The vehicle of claim 7 wherein:
    the limit switch is a lifting switch having a contact element.

9. The vehicle of claim 8 wherein:
    the second support member actuates the contact element to de-actuate the drive system when the trunk lid is in the opened lid position and the roof is in the loading roof position.

\* \* \* \* \*